No. 793,177. PATENTED JUNE 27, 1905.
H. G. CADY.
LUNG TESTER AND TOY.
APPLICATION FILED JAN. 23, 1905.

Witnesses
Chas. K. Davis
M. E. Moore

Inventor
Henry G. Cady
By Wm. N. Moore
Attorney

No. 793,177.

Patented June 27, 1905

UNITED STATES PATENT OFFICE.

HENRY G. CADY, OF PINE BLUFF, ARKANSAS.

LUNG-TESTER AND TOY.

SPECIFICATION forming part of Letters Patent No. 793,177, dated June 27, 1905.

Application filed January 23, 1905. Serial No. 242,306.

*To all whom it may concern:*

Be it known that I, HENRY G. CADY, a citizen of the United States, residing at Pine Bluff, in the county of Jefferson and State of Arkansas, have invented certain new and useful Improvements in Lung-Testers and Toys, of which the following is a specification.

My invention relates to improvements in a combined lung-tester and toy; and one object of my invention is the provision of a device which will perform the function of testing the lungs and combined with an amusing feature or toy, the device being extremely simple and inexpensive of production.

Another object of my invention is the provision of a combined toy and lung-tester which will prove a never-ending source of amusement and interest and which will test the lungs and register the power of the exhalation and insure the proper testing of the lungs, as well as making the operation a pleasure and delight.

With these objects in view my invention consists of a combined lung-tester and toy embodying novel features of construction and combinations of parts substantially as herein disclosed.

Figure 1:
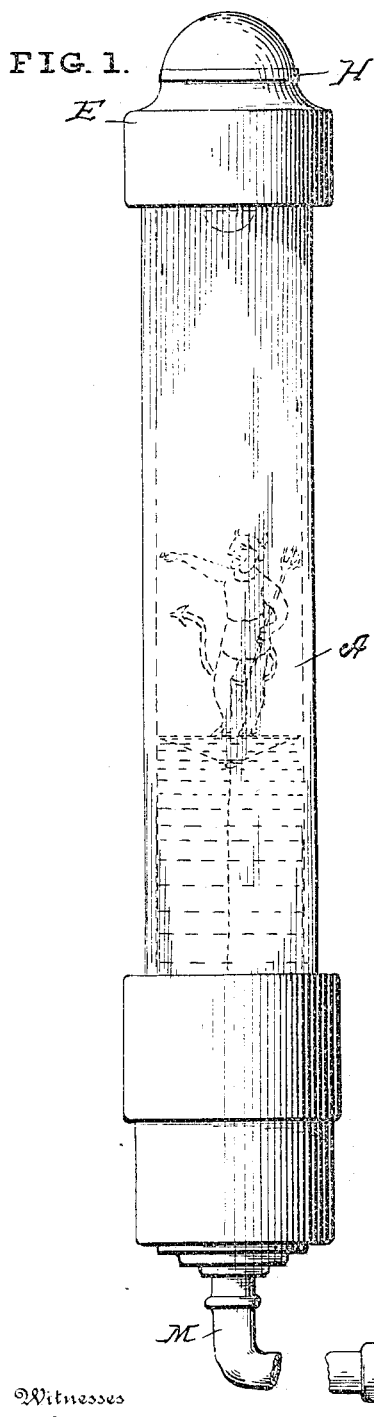
Figure 2:
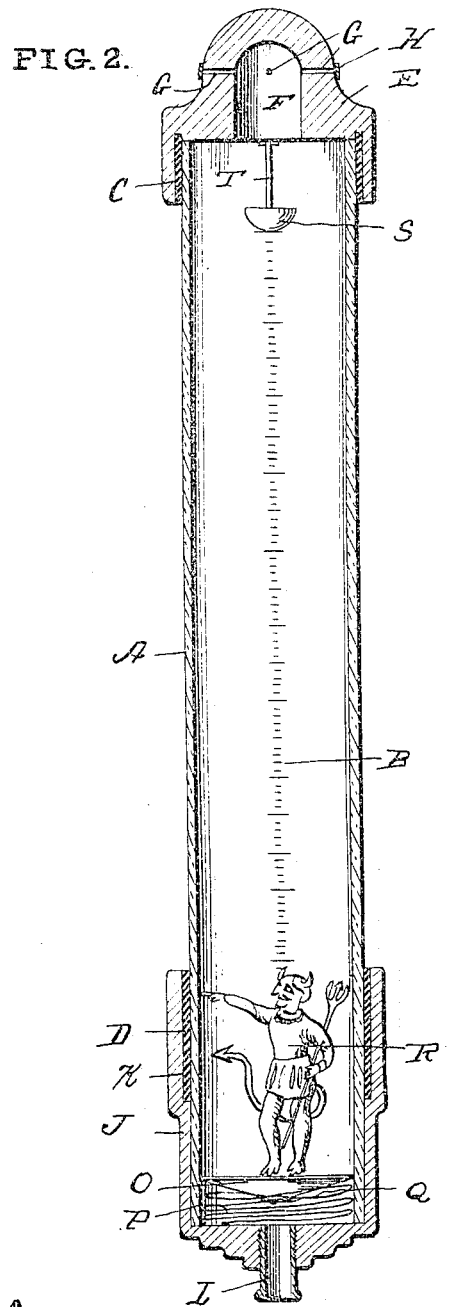

Figure 1 represents a side elevation of the complete device, and Fig. 2 represents a vertical central sectional view of the lung-testing toy.

In the drawings the letter A designates a hollow tube or column, preferably made of glass or transparent material and provided on one side with a scale B, and around the top of this tube is placed a rubber gasket or ring C, and around the lower portion is also placed a gasket or ring D. To the upper end of the tube is fitted the cap E, provided with a socket or seat for holding the gasket or ring C and provided with a socket or recess F, with which communicates the discharge-openings G, around which openings are placed a flexible or elastic band H, this band exerting sufficient pressure or resistance to only permit the escape of air when pressure from the lungs enters the tube. It will be noted that the openings G form discharge or air-exit openings, and the flexible or elastic band H acts as a regulator for the discharge of air through said openings, thus providing an air-exit-regulating device. To the lower end of the tube is fitted the sleeve J, provided with a recess K to receive the lower gasket or ring B and provided with an inlet-opening having a hollow stem L fitting therein, with which communicates the tube M, having the mouthpiece N, in which the air is forced from the lungs in the operation of testing the lungs. Fitting snugly within the tube is the float or follower O, to the lower side of which is connected one end of a cord Q, whose lower end is connected at P to the sleeve, and this cord is preferably made elastic or of spring-wire to exert its tension against the force of air from the lungs. Upon the follower is mounted a figure R, which may be some fanciful or odd-shaped toy, and in the upper portion of the tube is secured the bell S by means of the rod T, which is attached at its upper end to the cap.

From the foregoing description, taken in connection with the drawings, the operation of my device will be readily understood, and I would simply state that when desired to use the device air is forced through the mouthpiece and impinges against the lower face of the follower, forcing it upward against the tension of the cord or spring and registering the pressure upon the scale, and when forced to the highest point of the column the head of the figure contacts with the bell and sounds an alarm. Thus the device performs the twofold function of a very amusing and interesting toy as well as a tester and expander for the lungs, and the extreme simplicity and inexpensiveness of the device enables it to be used extensively. It will be noted that in normal or initial position the follower or figure is at the bottom of the tube and is hidden or obscured by the sleeve J; but when air is forced in at L the figure is moved up in sight, and this renders the device amusing as well as useful.

I claim—

1. A combined lung-tester and toy, consisting of a transparent vertical or upright column, an air-exit-regulating device at the upper end of said column, consisting of a cap having a series of openings and an elastic band covering said openings, an air inlet or supply device at the lower end of the column, a movable follower fitting in said column and adapted to register the pressure of air from the lungs.

2. A combined lung-tester and toy, consisting of a transparent vertical or upright column, an air exit and regulating device carried by said column, consisting of a cap having a series of openings and an elastic band covering said openings, an air inlet or supply device communicating with said column, a follower movable in said column under pressure of air from the lungs, and an elastic connection connected to the follower for exerting tension on the follower against the pressure of air.

3. A combined lung-tester and toy, consisting of a transparent vertical or upright column, an air exit and regulating device carried by said column, consisting of a cap having a series of openings and an elastic band covering said openings, an air inlet or supply device communicating with said column, a follower carrying a figure and movable in said column under pressure of air from the lungs, a scale for registering the pressure of air, and an elastic connection secured to the follower for exerting tension on the follower against the tension of air-pressure from the lungs and restoring said follower to its normal obscurity.

4. A combined lung-tester and toy consisting of a transparent column, an air-exit-regulating device at the upper end of said column, consisting of a cap having a series of openings and an elastic band covering said openings, an air inlet or supply device at the lower end of the column, a movable follower fitting in said column, and an alarm adapted to be struck by the follower, said follower being normally obscured at the bottom of the column.

In testimony whereof I affix my signature in presence of two witnesses.

HENRY G. CADY.

Witnesses:
 ROBERT W. GEIB,
 J. H. JONES.